(12) United States Patent
Petersen et al.

(10) Patent No.: US 11,052,567 B2
(45) Date of Patent: Jul. 6, 2021

(54) METHOD FOR LIQUID TREATMENT OF A WOOD SPECIES

(71) Applicant: SUPERWOOD A/S, Hampen (DK)

(72) Inventors: Benny Petersen, Karup (DK); Finn Imsgard, Kolding (DK); Anders Westh Kjellow, København NV (DK); João Luis Beja Fernandes, Ternitz (AT)

(73) Assignee: SUPERWOOD A/S

( * ) Notice: Subject to any disclaimer, the term of this patent is extended or adjusted under 35 U.S.C. 154(b) by 0 days.

(21) Appl. No.: 16/208,967

(22) Filed: Dec. 4, 2018

(65) Prior Publication Data

US 2019/0168411 A1    Jun. 6, 2019

Related U.S. Application Data

(63) Continuation of application No. 15/032,687, filed as application No. PCT/DK2014/050365 on Nov. 6, 2014, now abandoned.

(30) Foreign Application Priority Data

Nov. 6, 2013 (DK) .......................... PA 2013 70648

(51) Int. Cl.
*B27K 3/00* (2006.01)
*B27K 3/08* (2006.01)
*B27K 5/00* (2006.01)
*B01D 11/02* (2006.01)
(Continued)

(52) U.S. Cl.
CPC .......... *B27K 3/086* (2013.01); *B01D 11/0203* (2013.01); *B27K 3/0221* (2013.01); *B27K 3/0285* (2013.01); *B27K 5/008* (2013.01); *F26B 21/14* (2013.01); *B27K 2240/10* (2013.01); *B27K 2240/15* (2013.01); *B27K 2240/20* (2013.01); *B27K 2240/70* (2013.01); *F26B 2210/16* (2013.01)

(58) Field of Classification Search
None
See application file for complete search history.

(56) References Cited

U.S. PATENT DOCUMENTS 5,013,366 A * 5/1991 Jackson ................ B08B 7/0021
                                                                                    134/1
6,331,487 B2 * 12/2001 Koch .................... B08B 7/0021
                                                                                    134/2
(Continued)

FOREIGN PATENT DOCUMENTS

EP        1440779 A1       7/2004
JP    2010-266154 A1     11/2010
(Continued)

OTHER PUBLICATIONS

Machine Translation of JP 2010266154 A.*

*Primary Examiner* — David P Turocy
(74) *Attorney, Agent, or Firm* — Condo Roccia Koptiw LLP (57) ABSTRACT

The present invention relates to an improved method for impregnating a porous material, such as wood, more specifically a method in which an active ingredient to be deposited within the porous material is dissolved in condensed carbon dioxide and impregnated in the material.

19 Claims, 5 Drawing Sheets

(51) Int. Cl.
*B27K 3/02* (2006.01)
*F26B 21/14* (2006.01)

(56) References Cited

U.S. PATENT DOCUMENTS

| | | | |
|---|---|---|---|
| 6,576,066 B1 * | 6/2003 | Namatsu | F26B 5/005 |
| | | | 134/11 |
| 2004/0020510 A1 * | 2/2004 | Roseen | B08B 3/06 |
| | | | 134/1 |
| 2005/0196539 A1 | 9/2005 | Masuda et al. | |
| 2007/0169794 A1 * | 7/2007 | Han | H01L 21/02071 |
| | | | 134/94.1 |
| 2007/0264175 A1 * | 11/2007 | Iversen | B01D 11/0203 |
| | | | 422/235 |
| 2008/0178490 A1 * | 7/2008 | Matsunaga | F26B 7/00 |
| | | | 34/337 |
| 2010/0058607 A1 * | 3/2010 | Franich | B27K 3/0214 |
| | | | 34/255 |

FOREIGN PATENT DOCUMENTS

| | | |
|---|---|---|
| JP | 2010266154 A * | 11/2010 |
| WO | WO 00/27547 | 5/2000 |
| WO | WO 00/27601 | 5/2000 |
| WO | WO 03/095165 A2 | 11/2003 |
| WO | WO 2010/121624 A2 | 10/2010 |
| WO | WO 2011/066830 A1 | 6/2011 |

* cited by examiner

METHOD FOR LIQUID TREATMENT OF A WOOD SPECIES

CROSS REFERENCE TO RELATED APPLICATIONS

This application is a continuation of U.S. patent application Ser. No. 15/032,687, filed Apr. 28, 2016, which claims the benefit of National Stage Entry under 35 U.S.C. § 371 of Patent Cooperation Treaty Application No. PCT/DK2014/050365, filed Nov. 6, 2014 which claims the benefit of Denmark Patent Application 2013 70648, filed Nov. 6, 2013, the contents of which are hereby incorporated by reference herein.

The present invention relates to an improved method for treating a porous material, such as wood, more specifically a method in which a active ingredient to be deposited within the porous material is dissolved in condensed carbon dioxide and impregnated in the material under sub-critical conditions.

BACKGROUND

Methods for wood impregnation often use fluids under supercritical conditions when impregnating the wood protect it from deterioration caused by fungi and microorganisms and to extract undesired substances. Such methods are described generally in the art, and specifically in WO 00/27601, WO 03/095165 and US2005/0196539 A1, in which improved treatments of porous materials with supercritical fluids or subcritical $CO_2$ are claimed and described.

Carbon dioxide is an example of a supercritical fluid being the obvious choice for many industrial applications due to its many attractive characteristics, e.g. it is environmentally benign, nonhazardous, and inexpensive. Of main physical characteristics, carbon dioxide has a critical temperature near room temperature, a modest critical pressure, and a higher density than most supercritical fluids. In addition, carbon dioxide has proven to be a very good supercritical fluid solvent for a select variety of polymers and copolymers (Rindfleisch et al. 1996). The solvent power of carbon dioxide depends on its density as polymer solubility is proportional to $CO_2$ density (Rindfleisch et al 1996). Moreover, supercritical carbon dioxide is highly compressible with a high density even at low temperatures and pressures.

An improved method for impregnation using carbon dioxide is disclosed in WO 2010/121624 disclosing the treatment of a porous material in which an active ingredient is to be deposited within the porous material where in a first step during pressurization the active ingredient is kept in a mobile phase to allow penetration of the porous material and in a second step during depressurization is the active ingredient is kept in a stationary phase to persist within the porous material. By maintaining the active ingredient in the mobile phase during pressurization above the critical point (CP) was shown to shorten the treatment time and to provide an improved distribution of the active ingredient within the wood such as to the centre of the wood. Even though, this method has proven effective for fast effective distribution of the active ingredient within the porous material there is still a need to improve the treatment processes from an economical perspective since reducing treatment times and energy consumption without compromising the efficiency of the treatment is key to the competitiveness of such processes.

Therefore, the aim of the present invention is to provide an improved method for penetration and distribution of an impregnating active ingredient within a porous material ensuring an increased durability of the porous material.

SUMMARY OF THE INVENTION

This object is solved by a method for treating a porous material with an active ingredient comprising the steps of
  a. providing the porous material to a container;
  b. applying pressure, in the container, by providing gaseous carbon dioxide to the container, said container comprising the porous material, at a temperature below the critical point of carbon dioxide;
  c. applying further pressure to the container to condense carbon dioxide;
  d. providing an active ingredient, optionally solubilized, to the container, optionally premixed with carbon dioxide;
  e. maintaining the pressure and temperature for a predetermined period of time;
  f. increasing the temperature in the container to a temperature above the critical point of carbon dioxide at the prevailing pressure to provide carbon dioxide in supercritical form;
  g. maintaining the conditions obtained in step f. for a predetermined period of time; and
  h. reducing the pressure to atmospheric to provide a treated porous material and carbon dioxide in gaseous form.

Contrary to the prior art methods it was found that active ingredients can be more efficiently dissolved in the carrier fluid when added to the container substantially at the transformation point between gas and liquid carbon dioxide. Thus, a very high load of active ingredient could be obtained with lower energy consumption and surprisingly the transformation to supercritical state has shown not to affect the solubility. Thus, with the method of the invention the load of active ingredient per unit carrier fluid was shown to be at least the same as when in supercritical state or improved at a much lower pressure. Thus, the same or improved load is achieved at much lower production and installation costs.

Once the active ingredient has been efficiently loaded in the liquid carrier fluid, the fluid is transformed into its supercritical state, whereby the treatment of the wood takes place In the first step of the method subcritical gaseous carbon dioxide is added to a container comprising the porous material. By retaining the temperature at the subcritical point, pressure is increased inside the container and eventually carbon dioxide is converted to its liquid form.

The active ingredient is added with the gaseous carbon dioxide and preferably at the point where carbon dioxide condenses into its liquid phase, typically at 60-65 bar and 20-25° C. The conditions under which the active ingredient is laded are maintained at a predetermined period of time, 15 min to 30 minutes, more preferred 15 to 25 minutes, such as approximately 20 minutes.

After supply of the active ingredient the pressure is preferably further increased to reach the highest density of the mixture. At a temperature of 20-25° C. the pressure is around 80 to 120 bar. Depending on the temperature and the active ingredient, it is within the skill of the art to determine the optimal pressure.

Subsequently, the temperature is increased from subcritical temperature to critical such as 70° C. or 60° C. while maintaining the pressure at 80-120 bar, more preferred 80-100 bar, even more preferred 85-95 bar, such as 90 bar. When increasing the temperature the liquid carbon dioxide converts to a supercritical fluid within a time period of 20-30 minutes, causing a decrease in the density and allowing the active ingredient to immobilize on the stationary phase, i.e. the porous material. The supercritical state is also maintained at a predetermined period of time, such as 1 hour.

The depressurization step causes the carbon dioxide to revert to the gaseous phase and retract from the wood leaving the active ingredient inside providing the treated product.

In a particular embodiment, the porous material is a wood species since economy and efficiency in the process is key to providing a competitive product in the construction industry.

In another embodiment, the active ingredient is added to the container in step d. at a pressure, which is higher than the pressure in the container thereby forcing the active ingredient into the container at a faster rate than if pumped into the container. Thereby it is also facilitated that the active ingredient is better solubilised within the carbon dioxide carrier and thus distributed more evenly within the wood.

The active ingredient is preferably added to the container approximately at the point of condensation of carbon dioxide this has shown to provide the best solubility and stability of the carrier/active ingredient solution.

It is also preferred that the active ingredient is provided from the bottom of the container and thus rises upwards in the container.

The combination of high pressure and feeding active ingredient at the bottom is a presently preferred embodiment providing optimal solubilisation of the active ingredient in the carbon dioxide.

The combination of high pressure, feeding active ingredient at the bottom of the container and feeding at the condensing point of carbon dioxide may also be seen as a preferred embodiment.

In step b. the pressure is increased to approximately 50 bar at a temperature in the range of 15 to 25° C., In this temperature range the pressurisation in step b. causes compression of carbon dioxide as a gas. It is contemplated that the temperature may be higher or lower than specifically indicated, in such cases the pressure at which compression of a gas occurs will vary as well. The temperature indicated is however preferred from a process economical perspective.

The pressure reached in step c. is preferably in the range 70-90 bar, such as 70, 75, 80, 85 or 90 bar and the temperature is maintained in the range 15 to 25° C., such as 20° C., most preferred is a pressure of approximately 80 bar at approximately 20° C.

This ensures the desired condensation without phase change of the carbon dioxide carrier fluid to supercritical state. The pressure is advantageously chosen to be just above the critical pressure but below the critical temperature.

Since it was found that excellent solubilisation can be obtained in the liquid phase also for the purpose of treated porous materials, the pressure does not need to be as high as was previously believed to be necessary to achieve proper treatment or was required to solubilise enough active ingredient under supercritical conditions.

Thereby savings can be obtained in installation costs, as the pump needs less capacity. Further, savings can be made in operational costs simply because the process works at reduced pressure.

The temperature in step f. is increased to a temperature in the range 20 to 70° C., more preferred 30° C.-65° C., such as 25° C., 30° C., 35° C., 40° C., 45° C., 50° C., 55° C., and 60° C. and most preferred 60° C.

Preferably, the density of carbon dioxide in step e. should be above 750 kg/m$^3$, preferably above 800 kg/m$^3$.

The active ingredient usable in the context of the present invention is selected from but not limited to the group consisting of block polymers, modifiers of the building blocks of the porous material, of polymers and copolymers, block co-polymers, organic and inorganic biocides, aromas, colorants and organic or inorganic salts, polymers.

Biocides are preferably organic biocide such as selected from the group consisting of triazoles, pyrotroides, carbamates and salts of organic acids and any combination.

The treatment according to the invention is selected among impregnation, extraction, dying, increasing water resistance or drying and any combination thereof. In a particular embodiment the treatment is impregnation.

Treatment of e.g. wood depends on the specific application of the piece of wood, thus in a preferred embodiment the active ingredient is selected from the group consisting of water resistance improving polymers, water repellents, modifiers of the building blocks of the porous wood matrix and biocides or a combination thereof. Preferred water repellents are oils, copolymers, waxes and silicones.

The modifier of the building blocks of the porous wood matrix is selected from the group consisting of polymers or copolymers having bulky functional groups. The polymers/copolymers react with the porous media eliminating e.g. any free hydroxyl groups in the cellulose and filling the open spaces. Specific examples of wood modifiers are, fire retardants, inorganic salts, aromas, colorants, etc.

The purpose of modifying the porous material is to enhance preferred properties of the material, such as moisture and dimensional stability, or adding new properties to the material, such as adding fire retardants, to increase the resistance against fire, thermal insulating agents to improve the insulation power of the material etc.

The invention further relates to the treated porous material obtained by any of the embodiments of the method detailed above.

The invention will now be described in greater details with reference to the figures in which.

FIGURES

DETAILED DESCRIPTION OF THE INVENTION

In the context of the present invention a porous medium or a porous material is defined as a solid (often called frame or matrix) permeated by an interconnected network of pores (voids) filled with a fluid (liquid or gas). Usually both the solid matrix and the pore network (also known as the pore space) are assumed to be continuous, so as to form two interpenetrating continua such as in a sponge. In the context of the present invention preferred porous materials are selected from the group of silica, cellulose, gels, aerogels, cork and wood. A presently preferred porous material is wood, cork or cellulose and most preferred wood.

The most preferred carrier fluid according to the present invention is carbon dioxide a fluid, which has a relatively low critical pressure, low cost, is non-toxic and non-flammable. Additionally, carbon dioxide is easy to recover again from the treatment process for repeated use in the method. Carbon dioxide is particularly preferred when the active ingredient is a non-polar chemical.

Another advantage of using liquid carbon dioxide is that its viscosity is only about 1/10 that of water, hence, the surface tension in carbon dioxide is much lower than that for conventional organic solvents and the diffusivity of solutes is expected to be considerably higher. Consequently, carbon dioxide may be expected to penetrate porous materials better than simple liquids and solutes would be expected to diffuse faster within pores where carbon dioxide is the solvent than in analogous systems using conventional liquids (Beckman EJ, 2004).

Treatment of porous materials using liquid carbon dioxide can be regarded as a chromatographic process in which the liquid is considered the mobile phase and the porous material, such as wood fibre, is considered the stationary phase. Wood is an example of a porous material behaving like a chromatographic column, any other material, which is constituted of a porous material such as cellulose, silica etc. will behave in the same way. The various constituents or active ingredients will thus travel at different speed causing them to separate and distribute unequally if only dependent on the chromatographic process.

The active ingredient is solubilised in the carbon dioxide preferably at the phase transformation from gaseous to liquid and the solubilised carbon dioxide and active ingredient mixture is allowed to distribute evenly within the wood. After a predetermined time, the temperature is increased to above the critical point resulting supercritical carbon dioxide carrying the active ingredient.

In prior art methods of impregnating the wood attempts to move the equilibrium as far as possible towards the carrier fluid during the pressurization and impregnation part of the treatment cycle above the critical point has been done by increasing the pressure or lowering the temperature. This increases the density of the super critical carbon dioxide, and consequently the solubility of active ingredients in the carrier fluid and will ensure that the active ingredient is maintained in the mobile phase. According to the present invention pressure and temperature is kept below the critical point keeping the carbon dioxide at first in a gaseous form then when pressure is further increased the gaseous carbon dioxide condenses to form liquid carbon dioxide.

The active ingredient is added during or after the condensation, and preferably substantially during condensation as this has turned out to result in the most effective dissolution.

Some active ingredients solubilises more easily in carbon dioxide than others. One way to increase solubility is to add excipients. Examples of excipients are alcohols, preferably with low volatility, for example, propylene glycol or triethylene glycol. The excipients are preferably used as a formulation adjuvant and facilitate the loading of the active compounds to the process. Other purposes of the excipient can be to facilitate flowability of the active ingredient in the carrier fluid or simply to handle the active ingredient in liquid form for safety reasons.

The treatment may be an impregnation process where one or more active compounds are deposited in the wood. These active compounds may be biocides, fungicides, insecticides, colorants, fire retarding compounds, strength improving compounds etc.

The treatment may also be an extraction process where particular compounds are extracted from the wood, such as resin, terpenes etc., or it may be toxic compounds that have to be removed from wood before disposal of the wood.

Active ingredients usable in the present invention are selected from but not limited to the triazoles propiconazole and tebuconazole, iodopropynylbutylcarbamate (in the following IPBC), carbon dioxide, chlotianidin, dichlofluanid, difenacoum, difethialone, etofenprox, K-HDO, sulfuryl fluoride, thiabendazole, thiamethoxam and any combination of thereof. The ratio of active ingredient to carrier fluid is typically in the range of 1 ppm to 30% (weight/weight) depending on the active ingredient. When the active ingredient is a fungicide the preferred content is 10 ppm-20% (weight/weight).

Also, the treatment may increase the water resistance using block polymers as disclosed in WO2011/066830, which disclosed co-polymers where the at least one block-polymer has a structure selected from:

a triblock copolymer of the general formula (i)

B-(B)$_y$-A-(A)$_x$-A-(B)$_{y1}$—B; and a grafted copolymer of the general formula (ii)

$$A-(A)_x-(A)_y-A$$
$$\quad\quad\quad |$$
$$\quad\quad (B)_z-B,$$

wherein A is a hydrophobic block, B is a hydrophilic block and, x, y, y$_1$ and z independently are 0 or an integer, preferably where x is 0-40, y is 1-20, y$_1$ is 1-20 and z is 1-20 and x+y+(y$_1$ or z)≤50.

In preferred embodiments the hydrophilic block B comprises at least one functional group capable of forming a covalent bond with a hydroxy group. And more preferred the functional group is selected from an epoxide, carbonate, anhydride and ester group. In other embodiments the polymer is mixed with a catalyst that promotes ring opening reactions and transesterification.

In more preferred embodiments the hydrophobic block of the at least one block-polymer is made of a monomer unit selected from the group consisting of: Polypropylene ether, Polypropylene ether having the formula —CH$_2$—CH(CH$_3$)—O—, Polyalkyl ether having the formula —CH$_2$—CH(R$_3$)—O—, wherein R$_3$ is (CH$_2$)$_n$—CH$_3$ or —(CF$_2$)$_n$—CF$_3$. and n=0 to 10, polylactate having the formula —O—CH(CH$_3$)—CO—, polycaprolactone having the formula —O—(CH$_2$)$_5$—CO—, polyvinylalkylate having the formula —CH$_2$—CH(OCO—R$_4$)—, wherein R$_4$ is (CH$_2$)$_n$—CH$_3$, and n=1 to 10, siloxane-di-methyl having the formula —Si(CH$_3$)$_2$—O—, siloxane-di-alkyl having the formula —Si(R$_5$)$_2$—O— wherein R$_5$ is (CH$_2$)$_n$—CH$_3$ and n=1 to 10, siloxane-di-aryl having the formula —Si(R$_6$)$_2$—O— wherein R$_6$ is Phenyl, cyclopentadienyl, or a mixture of R$_5$ and R$_6$ having the same meaning as above, perfluoroethylene ether having the formula —CF$_2$—CF$_2$—O—, perfluoropropylene ether having the formula —CF$_2$—CF(CF$_3$)—O—, perfluoroethylene having the formula —CF$_2$—CF$_2$—, and poly(ethercarbonate) having the formula —O—CH$_2$CH(CH$_3$)—OCO—, and the hydrophilic block of the at least one block-polymer is made of a monomer unit selected from the group consisting of: polyethylene ether having the formula —CH$_2$—CH$_2$—O—, polypropylene ether having the formula —$CH_2$—$CH(CH_3)$—O—, polyethylene amine having the formula —$CH_2$—$CH_2$—NH—, polyvinylacetate having the formula —$CH_2$—$CH(OCOCH_3)$—, polyvinylalkohol having the formula —$CH_2$—CH(OH)—, polyacrylate having the formula —$CH_2$—$CH_2$—CO—$R_1$, wherein $R_x$ is selected from OH, $CH_2$—$CH_2$—OH, ($CH_2$—$CH_2$—O)$_n$, ($CH(CH_3)$—$CH_2$—O)$_n$, $NH_2$, $NHR_2$, $NR_2$, wherein $R_2$ has the meaning below, $CH_2$—$CH_2$—NH and n=1 to 10, polyvinyl cyclic amide or amine having the formula —$CH_2$—$CH_2$—$R_2$, wherein $R_2$ is [N—CO—$(CH_2)_3$], or a cyclic amine; and mixtures of at least two of members of the group.

At present the most preferred polymers are those where the hydrophilic monomer unit is a pair of monomers selected from: (i) the polyethylene ether and polypropylene ether, or (ii) polyvinyl acetate and polyvinylalkohol.

The method of the present invention generally comprises, but is not limited to, the following steps:

a. a container is loaded with wood or another species to be treated;

b. the container is pressurised using gaseous carbon dioxide. The temperature is cool, that is at or below ambient temperatures, such as in the range 15-25° C. The temperature is controlled and adjusted by means known to the skilled person. Up until a pressure of approximately 50 bar, the pressurisation causes carbon dioxide to compress as a gas.

c. The container is further pressurised to condense carbon dioxide to a liquid while maintaining the temperature as indicated above;

d. the required amount of active ingredient which may be a liquid or dissolved solid optionally premixed with carbon dioxide. The active ingredient in liquid form is fed to the container. The influent for active ingredients may be the same as for carbon dioxide or separate. In preferred embodiments, the active ingredient is at a pressure which is higher than the pressure in the container, such as 80 bar, whereby fast entry of the active ingredient is ensures. In a further embodiment the active ingredient is fed to the container at a location that is different from the entry point of carbon dioxide, feeding at the lower part of the container such as from the bottom part has surprisingly shown to provide the best results.

The combination of higher pressure and entry from the bottom part of the container is also contemplated.

e. after entry of the active ingredient a predetermined holding period is provided where the active ingredient is dissolved in the liquid carbon dioxide and the mixture is allowed to transport in the pores of the wood held in the container. This first holding period may last for a period of time in the range of 45 min to 85 min, such as approximately an hour;

f. after the first holding period the temperature is increased so that at the prevailing pressure, carbon dioxide is transformed to its supercritical state;

g. depressurising the vessel to ambient pressure followed by removal of the treated wood.

Treatment times vary with the properties of the porous media, such as porosity, permeability, affinity of the carrier fluid and the porous material to the active ingredients as well as the active ingredient.

The invention will now be described in more details in the following non-limiting examples.

EXAMPLES

Illustrative Example 1—Treatment According to the Method of the Invention

In a first illustrative example wood was impregnated in an impregnation container which was kept cold at about 20° C., i.e. below the critical temperature of 31° C. for carbon dioxide. The pressure was increased from atmospheric to about 50 bar to compress the gaseous carbon dioxide (see FIG. 2a, step 1 to 2). Subsequently, the pressure was further increased to 80 bar. At about 50 bar at 20° C. the gaseous carbon dioxide is compressed to liquid carbon dioxide, whereby the density of the carbon dioxide in point 2 of FIG. 2a (approx. 80 bar and 20° C.) was above 800 kg/m³

Figure 1:
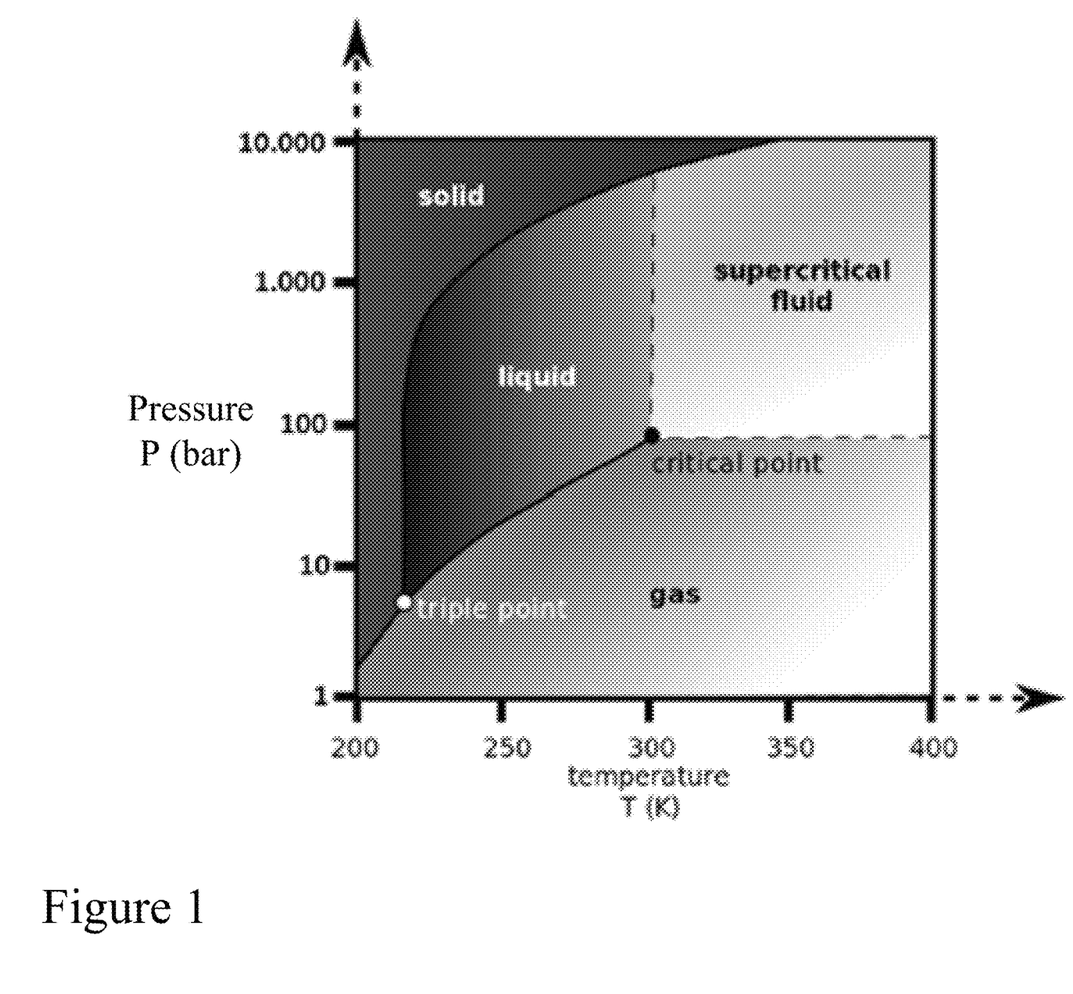
FIG. 1 depicts a standard pressure-temperature phase diagram for carbon dioxide showing the triple point and critical point of carbon dioxide.
Figure 2A:
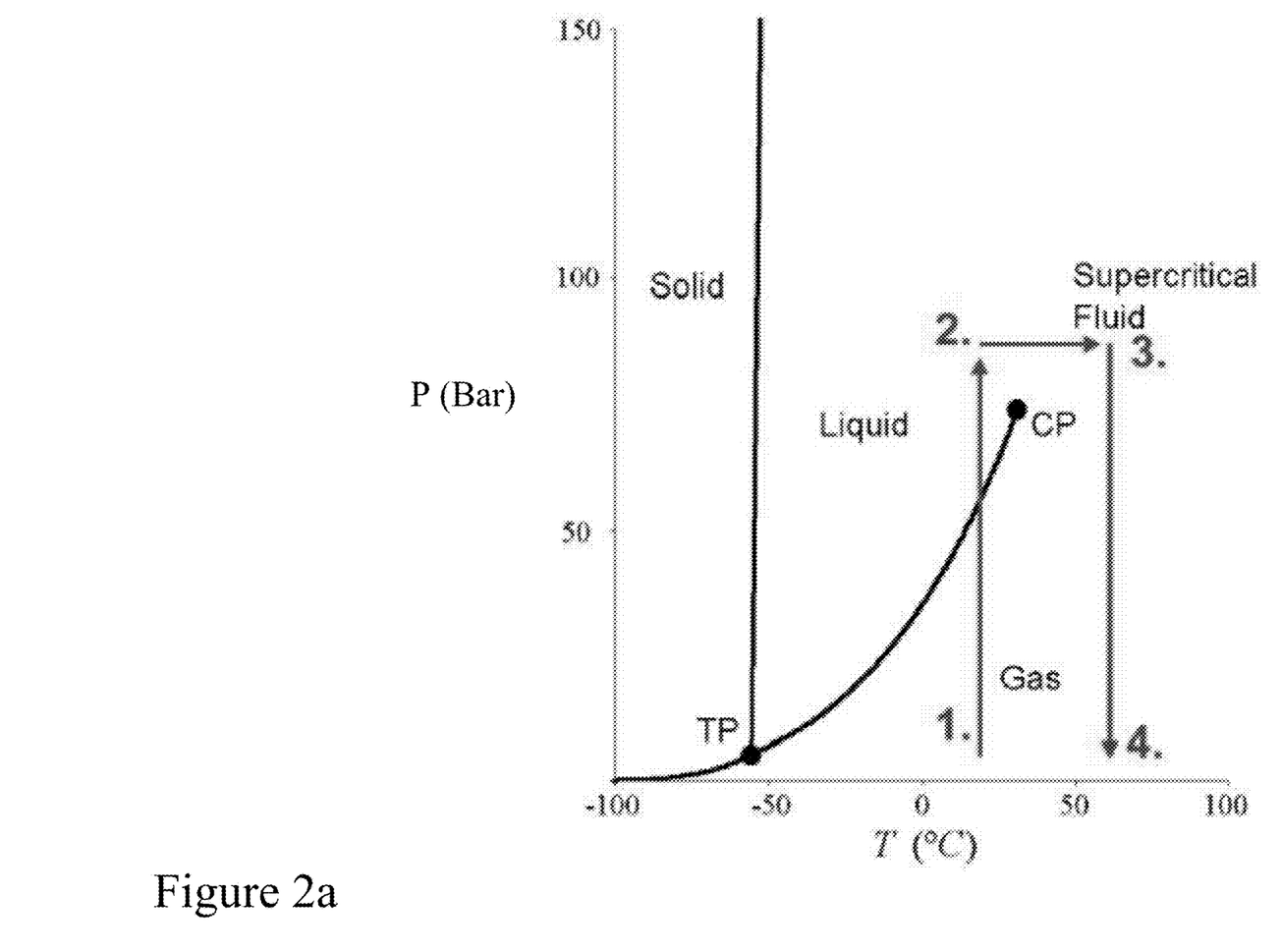
FIG. 2*a* is an illustration of treatment according to the method of the invention as detailed in example 1.

The temperature was then increased from below the critical to above the critical (super critical) temperature, that is from approx. 20° C. to approx 60° C. and the carbon dioxide transformed from a liquid phase to a supercritical phase (FIG. 2a, points 2-3). The final step was a decompression step from approx. 80 bar to atmospheric pressure at approx. 60° C.

Comparative Example 1

In the prior art method for impregnation of pine sap wood, the pressure applied to the container was approximately 150 bar while keeping the temperature above the critical temperature at all times to prevent formation of carbon dioxide in a liquid form in any part of the process. The final step of treatment was decompression from approx. 150 bar to atmospheric pressure (1 bar).

Figure 2B:
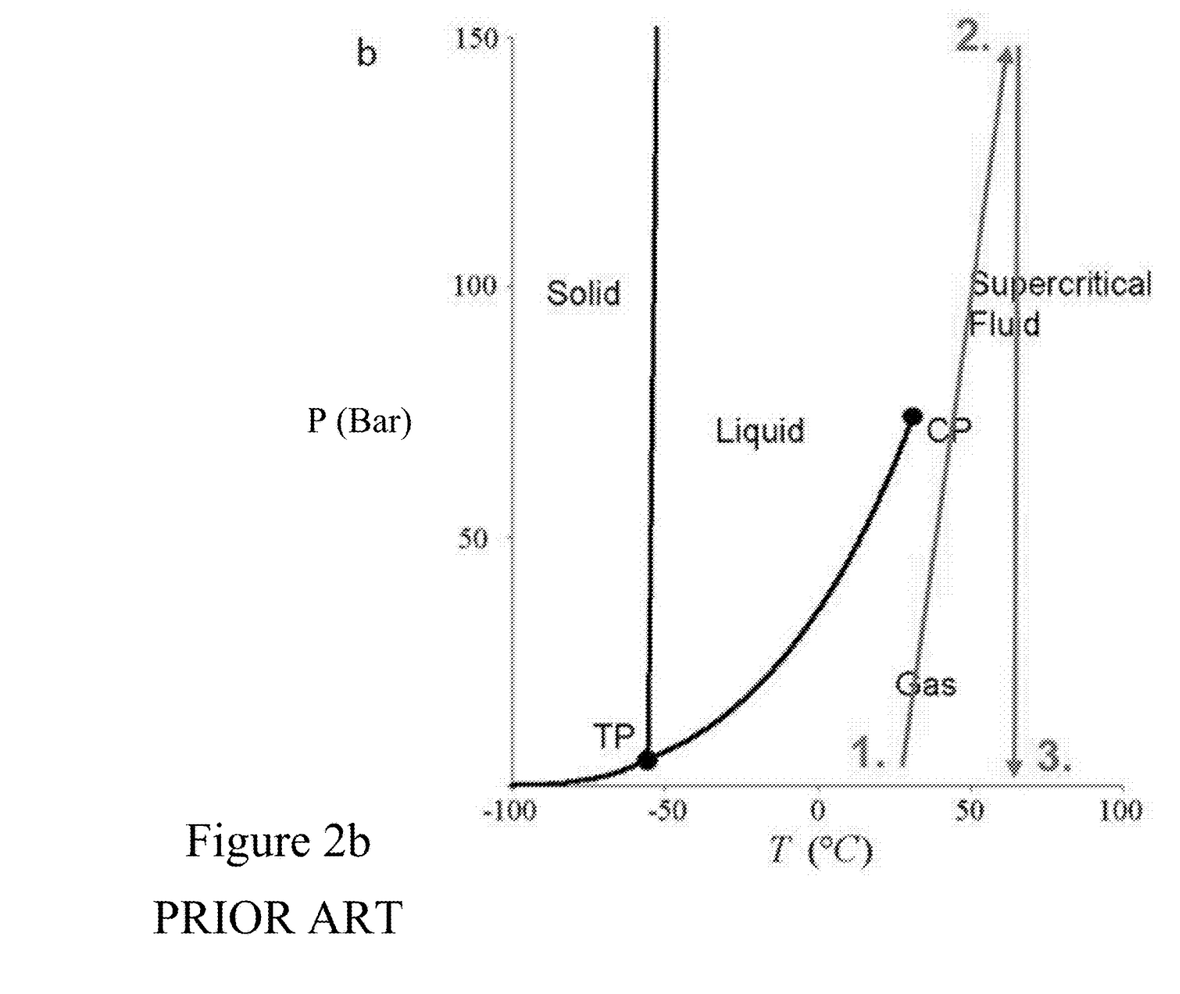
FIG. 2*b* is an illustration of impregnation according to the prior art as detailed in comparative example 1.

The density in point 2, FIG. 2b at 150 bar and 50° C. was approx. 790 kg/m³. Thus, in the prior art method to achieve a high density of approx. 750-800 kg/m³ a much larger pressure and higher temperature were needed.

Example 2—Density of Carbon Dioxide at Various Pressure-Temperature

Figure 3:
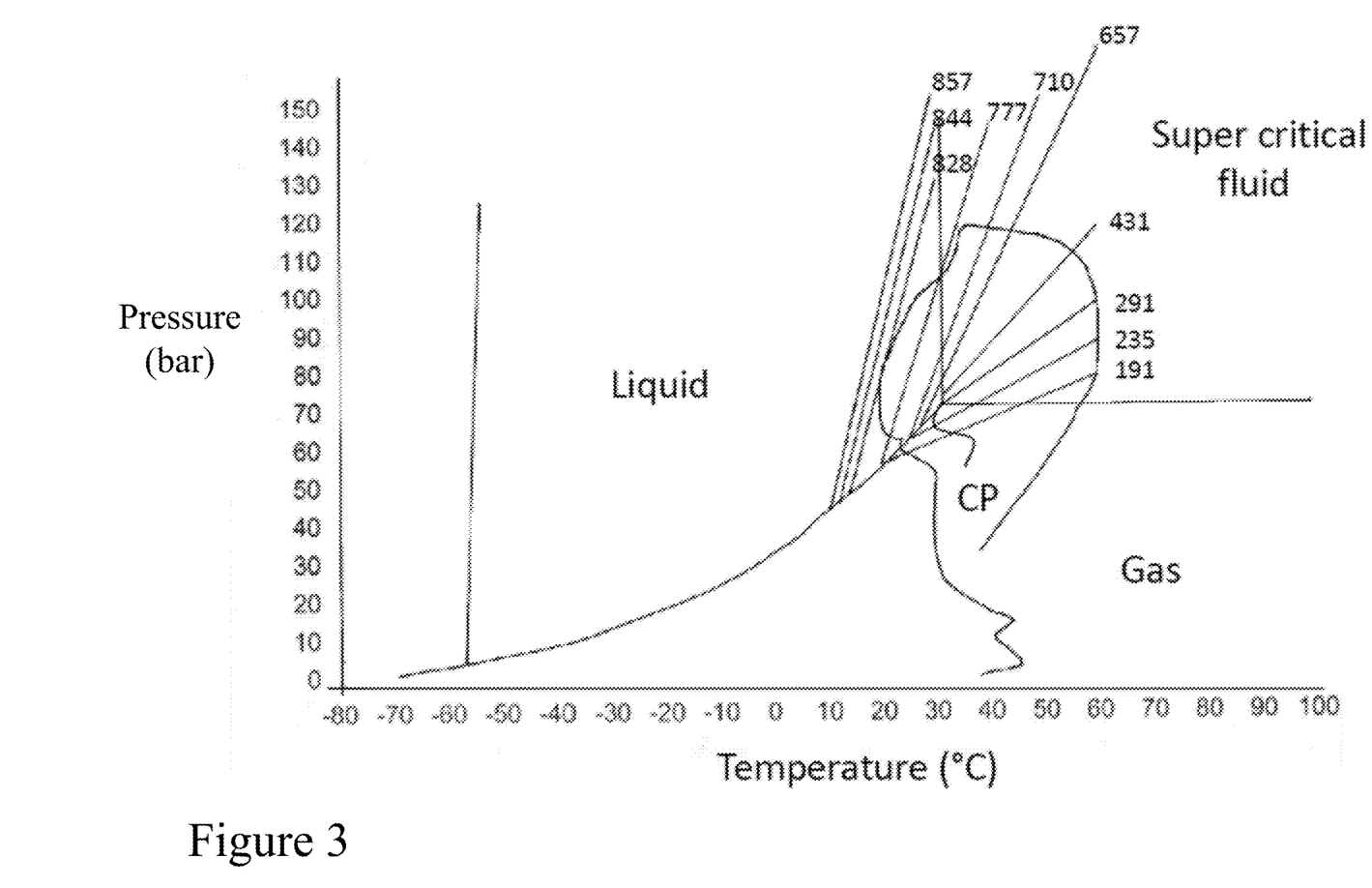
FIG. 3 is a density-pressure phase diagram for carbon dioxide and the results of a treatment process according to the method of the invention (referred to in examples 1 and 3)

The change of density of carbon dioxide at increasing temperatures (range 20-60° C.) in a container of 10.67 m³ was monitored, which his illustrated in FIG. 3.

TABLE 1

Density of carbon dioxide at increasing temperatures

| Phase of CO2 | T (° C.) | P (Bar) | Mass (kg $CO_2$) | Density (kg $CO_2/m^3$) |
|---|---|---|---|---|
| Liquid | 30 | 160 | 9,144 | 857 |
| Liquid | 30 | 154 | 9,005 | 844 |
| Liquid | 30 | 135 | 8,834 | 828 |
| Supercritical fluid | 40 | 147 | 8,290 | 777 |
| Supercritical fluid | 50 | 155 | 7,575 | 710 |
| Supercritical fluid | 60 | 165 | 7,010 | 657 |
| Supercritical fluid | 60 | 120 | 4,598 | 431 |
| Supercritical fluid | 60 | 100 | 3,105 | 291 |
| Supercritical fluid | 60 | 90 | 2,507 | 235 |
| Supercritical fluid | 60 | 80 | 2,038 | 191 |

TABLE 2

Density of carbon dioxide and active ingredient at increasing pressure.

| Phase of $CO_2$ | T (° C.) | P (Bar) | Mass (kg) | Density (kg/m³) |
|---|---|---|---|---|
| Liquid | 21 | 63.6 | 8,300 | 778 |
| Liquid | 21 | 65.2 | 8,580 | 804 |

TABLE 2-continued

Density of carbon dioxide and active ingredient at increasing pressure.

| Phase of $CO_2$ | T (° C.) | P (Bar) | Mass (kg) | Density (kg/m³) |
|---|---|---|---|---|
| Liquid | 20 | 70.7 | 8,960 | 840 |
| Liquid | 22 | 85.6 | 9,650 | 904 |
| Supercritical fluid | 33 | 119 | 10,432 | 978 |
| Supercritical fluid | 35 | 120 | 10,456 | 980 |

Example 3—Treatment According to the Invention

Figure 4:
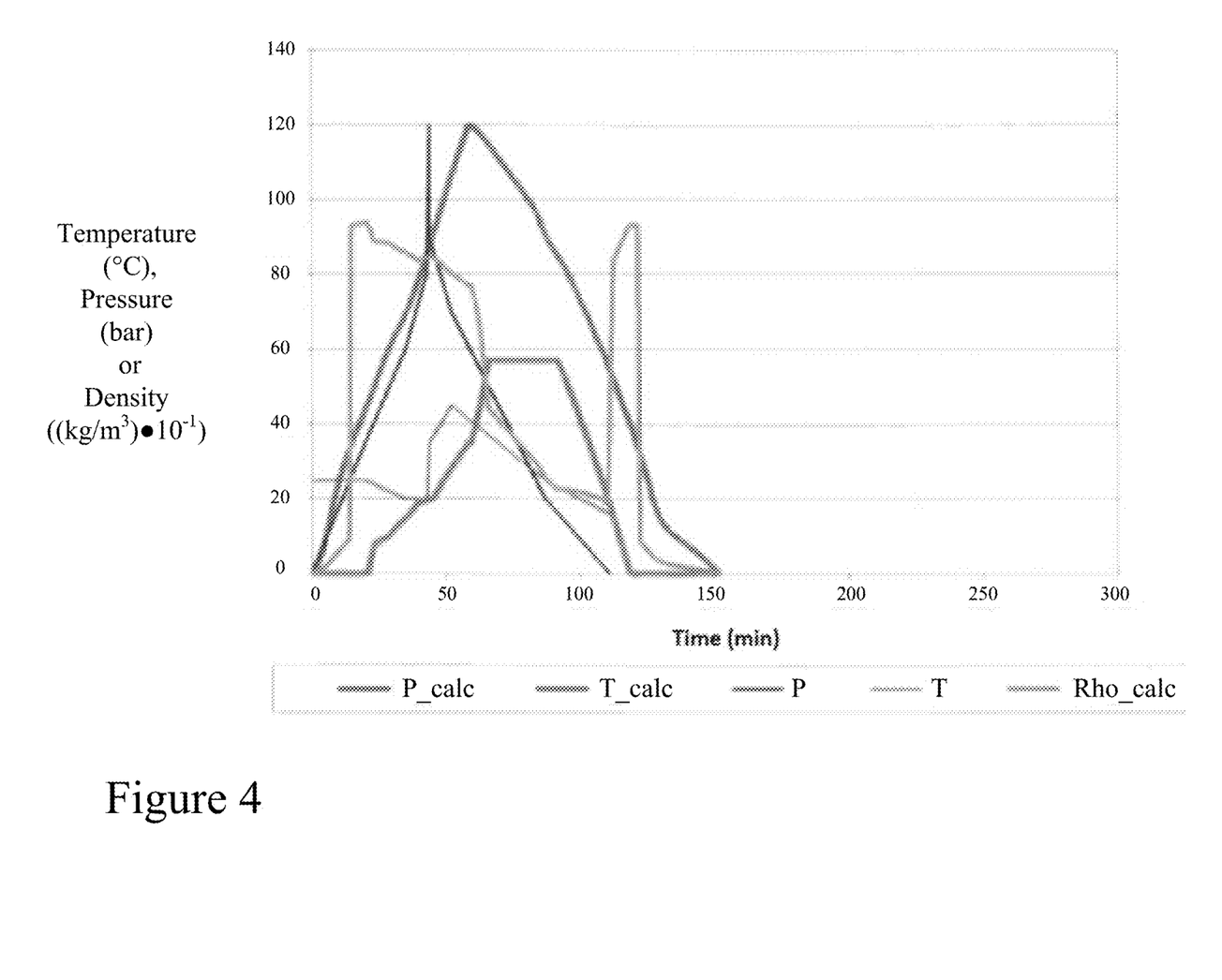
FIG. 4 shows time/temperature/pressure/density curves.

A piece of pine wood was treated with SC200, a mixture of propiconazole, tebuconazole and IPBC and/or a siloxane polymer according to the process of the invention. The specific time, temperature, pressure and density are given in table 3 below and illustrated in FIG. 4:

The wood was placed in an impregnation vessel having a volume of 8 m³

Carbon dioxide was added to the container at a rate of 250 l/min, and the pressure and temperature were adjusted to the desired conditions, i.e. "pressure 1" and "pressure 2"

below the critical temperature at the condensing point of carbon dioxide the active ingredient was fed to the container Active Ingredient was added at 58 bar.

Impregnation occurred at t=44 mins at 80 bar and 35° C.

Subsequently, the temperature was increased to above the critical point

The vessel was depressurised in a three steps to reduce the risk of damage to the wood The wood was removed from the impregnation vessel and was ready to be used.

TABLE 3

| | Time (min) | Acc. time (min) | P (Bar) | T (° C.) | Density of $CO_2$ (kg/m³) |
|---|---|---|---|---|---|
| Start | 0 | 0 | 0 | 25 | 1.8 |
| Pressure 1 | 20 | 20 | 35 | 25 | 80.9 |
| Pressure 2 | 15 | 35 | 60 | 20 | 787.9 |
| Pressure 3 | 8 | 43 | 80 | 20 | 830.5 |
| Impregnation | 1 | 44 | 120 | 35 | 768.8 |
| Heating | 0 | 44 | 90 | 35 | 664.6 |
| Depressurizing 1 | 8 | 52 | 70 | 45 | 188.1 |
| Depressurizing 2 | 35 | 87 | 20 | 25 | 42.1 |
| Depressurizing 3 | 24 | 111 | 0 | 16 | 1.8 |
| Batch time | 111 | | | | |
| Start pump | | | 80 | | |
| End pump | | | 80 | | |

The invention claimed is:

1. A method for treating a wood species with an active ingredient, the method comprising:
providing the wood species in a container;
applying pressure, in the container, by providing gaseous carbon dioxide to the container, said container comprising the wood species, at a temperature below the critical point of carbon dioxide to provide a compressed gas;
further pressurizing the container to reach a prevailing pressure in the container and to provide condensed carbon dioxide;
providing an active ingredient to the container comprising the wood species, wherein the active ingredient is applied simultaneous as the gaseous carbon dioxide is provided to the container, and wherein the active ingredient is selected from the group consisting of polymers for increasing water resistance, organic and inorganic biocides, aromas, colorants and organic and inorganic salts;
maintaining the prevailing pressure for a first predetermined period of time while the active ingredient is in the container;
increasing the temperature in the container to a temperature above the critical point of carbon dioxide at the prevailing pressure to provide carbon dioxide in supercritical form;
maintaining the temperature in the container at a temperature at or above the critical point of carbon dioxide at the prevailing pressure for a second predetermined period of time, wherein the second period of time occurs after the first period of time; and
thereafter, reducing the pressure in the container to atmospheric to complete the treatment of the wood species and to provide carbon dioxide in gaseous form, wherein the treatment of the wood species results in one or more of: the wood species being impregnated with the active ingredient, a compound being extracted from the wood species, the wood species being dyed, or the water resistance of the wood species being increased.

2. A method according to claim 1, wherein the active ingredient is added to the container at a higher pressure, wherein the higher pressure is higher than the prevailing pressure.

3. A method according to claim 2, wherein the active ingredient is added to the lower part of the container.

4. A method according to claim 1, wherein the active ingredient is added at a time approximately when condensation of carbon dioxide occurs.

5. A method according to claim 1, wherein the further pressure applied to the container to provide condensed carbon dioxide reaches a pressure in the range 70-90 bar and the temperature is in the range 15 to 25° C.

6. A method according to claim 5, wherein the further pressure applied to the container to provide condensed carbon dioxide reaches a pressure of approximately 80 bar and the temperature is approximately 20° C.

7. A method according to claim 1, wherein the temperature above the critical point of carbon dioxide at the prevailing pressure is increased to a temperature in the range 20 to 70° C.

8. A method according to claim 7, wherein the temperature above the critical point of carbon dioxide at the prevailing pressure is approximately 60° C.

9. A method according to claim 1, wherein the density of carbon dioxide while the further pressure is maintained for the predetermined amount of time is above 750 kg/m³.

10. A method according to claim 9, wherein the density of carbon dioxide while the further pressure is maintained for the predetermined amount of time is above 800 kg/m³.

11. A method according to claim 1, wherein the biocide is an organic biocide selected from the group consisting of triazoles, pyrotroides, carbamates and salts of organic acids.

12. A method according to claim 1, wherein the active ingredient applied to the container is solubilized and premixed with carbon dioxide.

13. The method according to claim 1, wherein maintaining the prevailing pressure for a predetermined period of time, increasing the temperature in the container to a temperature above the critical point of carbon dioxide at the prevailing pressure, maintaining the temperature in the container to a temperature above the critical point of carbon dioxide at the prevailing pressure for a predetermined period of time; and reducing the pressure in the container to atmospheric to provide a treated porous material and carbon dioxide in gaseous form are each performed after providing the active ingredient to the container.

14. A method for treating a wood species with an active ingredient, the method comprising the sequentially performed steps of:

providing the wood species in a container;

applying pressure, in the container, by providing gaseous carbon dioxide to the container, said container comprising the wood species, at a temperature below the critical point of carbon dioxide to provide a compressed gas;

further pressurizing the container to reach a prevailing pressure in the container and to provide condensed carbon dioxide;

providing an active ingredient to the container comprising the wood species, wherein the active ingredient is selected from the group consisting of polymers for increasing water resistance, organic and inorganic biocides, aromas, colorants and organic and inorganic salts;

maintaining the prevailing pressure for a first predetermined period of time;

increasing the temperature in the container to a temperature above the critical point of carbon dioxide at the prevailing pressure to provide carbon dioxide in supercritical form;

maintaining the temperature in the container at a temperature at or above the critical point of carbon dioxide at the prevailing pressure for a second predetermined period of time, wherein the second period of time occurs after the first period of time; and thereafter, reducing the pressure in the container to atmospheric to complete the treatment of the wood species and to provide carbon dioxide in gaseous form, wherein the treatment of the wood species results in one or more of: the wood species being impregnated with the active ingredient, the wood species being dyed, or the water resistance of the wood species being increased.

15. A method according to claim 14, wherein the first predetermined period of time is at least 45 minutes.

16. A method according to claim 14, wherein the active ingredient is added to the container at a higher pressure, wherein the higher pressure is higher than the prevailing pressure.

17. A method according to claim 16, wherein the active ingredient is added to the lower part of the container.

18. A method according to claim 14, wherein the biocide is an organic biocide selected from the group consisting of triazoles, pyrotroides, carbamates and salts of organic acids.

19. A method according to claim 1, wherein the first predetermined period of time while the active ingredient is in the container is at least 45 minutes.

* * * * *